US009423066B2

(12) United States Patent
Wang

(10) Patent No.: US 9,423,066 B2
(45) Date of Patent: Aug. 23, 2016

(54) SUPPORT ARM WITH A MULTIPLE DEGREE OF FREEDOM LOCKING DEVICE

(71) Applicant: Hiwin Technologies Corp., Taichung (TW)

(72) Inventor: Ren-Jeng Wang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 239 days.

(21) Appl. No.: 14/227,734

(22) Filed: Mar. 27, 2014

(65) Prior Publication Data

US 2015/0273703 A1    Oct. 1, 2015

(51) Int. Cl.
*E04G 3/00*    (2006.01)
*F16M 11/20*   (2006.01)

(52) U.S. Cl.
CPC ..... *F16M 11/2014* (2013.01); *F16M 2200/022* (2013.01); *F16M 2200/063* (2013.01); *Y10S 901/20* (2013.01); *Y10T 74/20305* (2015.01)

(58) Field of Classification Search
CPC .............. F16M 1/00; F16M 2200/063; F16M 2200/02; F16M 2200/021; F16M 2200/022; F16M 2200/025; F16M 2200/027; A61B 19/26; B60N 2/045; B60N 2/507
USPC ................... 248/231.21, 284.1, 184.1, 276.1, 248/280.11, 281.11; 403/117
See application file for complete search history.

(56) References Cited

U.S. PATENT DOCUMENTS

| | | | | |
|---|---|---|---|---|
| 3,122,348 A | * | 2/1964 | Wilkinson | F16M 11/04 248/230.1 |
| 5,388,308 A | * | 2/1995 | Meeuwissen | A47L 9/248 16/340 |
| 5,553,820 A | * | 9/1996 | Karten | A47B 21/0314 248/181.2 |
| 6,695,270 B1 | * | 2/2004 | Smed | F16M 11/04 248/274.1 |
| 7,513,473 B2 | * | 4/2009 | Lu | F16M 11/10 248/276.1 |
| 2008/0093514 A1 | * | 4/2008 | Carnevali | F16B 7/14 248/157 |

* cited by examiner

*Primary Examiner* — Christopher E Garft
(74) *Attorney, Agent, or Firm* — Wang Law Firm, Inc.

(57) ABSTRACT

A support arm with a multiple degree of freedom locking device includes a support arm unit, an outer housing unit, a feed screw, a conical push block, and two conical baffles. When the feed screw rotates in a first direction, the conical push block and the conical baffle are driven are rotated to make the outer annular baffle slanting surface press against the inner surface of the pivot space and the first and second pivot portions, so that the lateral housing is unable to pivot with respect to the upper and lower housing, and the first and second pivot portions are positioned between the two ears in a non-rotatable manner, when the feed screw rotates reversely, the lateral housing will be able to pivot with respect to the upper and lower housing, and the first and second pivot portions are able to pivot with respect to the two ears.

1 Claim, 11 Drawing Sheets

SUPPORT ARM WITH A MULTIPLE DEGREE OF FREEDOM LOCKING DEVICE

BACKGROUND OF THE INVENTION

1. Field of the Invention

The present invention relates to a support arm, and more particularly to a support arm with a multiple degree of freedom locking device.

2. Description of the Prior Art

Referring to FIG. 1, a conventional support arm for a gravity balance mechanism comprises: a lower rack 11, an upper connecting rod 12 and a lower connecting rod 13 each have one end connected to the lower rack 11, a spring 14 disposed between the upper and lower connecting rods 12, 13, and an upper rack 15 which is provided for mounting of a tool (not shown) is connected to another end of the upper and lower connecting rods 12, 13. With the multi-link device and the spring 14, the support arm 10 is able to support and fix the tool. Furthermore, with the spring 14 disposed between the upper and lower connecting rods 12, 13, the support force provided by the support arm 10 can change along with the change of rotation angle to support the weight of the tool, and the tool can be well positioned during the adjustment process or after adjustment, without the possibility of moving under the influence of gravity.

However, the adjustment of the tool usually involves multiple degrees of freedom, and the support arm 10 itself does not allow locking and adjustment of different degrees of freedom.

The present invention has arisen to mitigate and/or obviate the afore-described disadvantages.

SUMMARY OF THE INVENTION

The primary objective of the present invention is to provide a support arm with a multiple degree of freedom locking device, which enables a tool or an object installed on the support arm to be adjusted with multiple degrees of freedom, and the tool can be firmly positioned after adjustment.

To achieve the above objective, a support arm with a multiple degree of freedom locking device in accordance with the present invention comprises: a support arm unit, an outer housing unit, a feed screw, a conical push block, and two conical baffles. The support arm unit includes a rack, a first connecting rod with a first pivot portion pivoted to the rack, and a second connecting rod with a second pivot portion pivoted to the rack. The outer housing unit includes an upper housing, a lower housing, and a lateral housing pivoted to the upper and lower housings, the lateral housing includes two ears for pivotally clamping the first and second pivot portions and defines a pivot space with respect to the upper and lower housings, and the pivot space is in communication with the first and second pivot portions. The feed screw is pivotally inserted in the outer housing unit and able to move up and down, and includes a threaded portion disposed in the pivot space, and a rotation portion located outside the pivot space. The conical push block is pivotally disposed in the pivot space and able to move up and down, and includes a threaded hole for meshing with the threaded portion, and an annular push-block slanting surface disposed on a lateral surface of the conical push block. The at least one conical baffle is disposed in the pivot space in an expandable manner and located between the conical push block and the lateral housing, and the conical baffle includes an inner annular baffle slanting surface for abutting against the annular push-block slanting surface, and an outer annular baffle slanting surface located toward the inner surface. When the feed screw rotates in a first direction, the conical push block and the conical baffle are driven to rotate to make the outer annular baffle slanting surface press against the inner surface of the pivot space and the first and second pivot portions, so that the lateral housing is unable to pivot with respect to the upper and lower housing, and the first and second pivot portions, are positioned between the two ears in a non-rotatable manner, when the feed screw rotates in a second direction reverse to the first direction, the conical push block and the conical baffle are also driven to rotate to make the outer annular baffle slanting surface move away from the inner surface of the pivot space and the first and second pivot portions, so that the lateral housing is able to pivot with respect to the upper and lower housing, and the first and second pivot portions are able to pivot with respect to the two ears.

Preferably, a plurality of guide rods are inserted between the upper and lower housings, and the conical push block is sleeved on the guide rods and slides along the guide rods to move up and down between the upper and lower housings, the annular push-block slanting surface tapers from the lower housing toward the upper housing, and the inner annular baffle slanting surface of the conical baffles tapers from the lower housing toward the upper housing.

Preferably, the support arm with a multiple degree of freedom locking device further comprises a linkage housing, a linkage shaft, a linkage block and a linkage rod, the linkage housing is fixed to the lower housing and formed with a storage space. The feed screw further comprises a rod portion opposite the threaded portion and disposed in the storage space. The linkage shaft is pivotally disposed in the linkage housing and includes a first shaft portion disposed in the storage space, and a second shaft portion connected to the first shaft portion and located outside the storage space. The linkage block is slantingly disposed in the storage space and located between the rod portion and the linkage shaft, and includes a first linkage portion pivoted to the rod portion, and a second linkage portion. The linkage rod is horizontally disposed in the storage space and located between the linkage block and the linkage shaft, and includes a linkage rod portion pivoted to the second linkage portion, and an arc-shaped abutting portion. When the feed screw rotates in the first direction, the rod portion pushes the linkage block from an inclined position to a horizontal position where the arc-shaped abutting portion of the linkage rod presses against the first shaft portion, so that the linkage shaft is disposed in the linkage housing in a non-rotatable manner, and when the feed screw rotates in the second direction, the rod portion pushes the linkage block back into the inclined position from the horizontal position where the arc-shaped abutting portion of the linkage rod moves away from the first shaft portion, so that the linkage shaft is disposed in the linkage housing in a rotatable manner.

Preferably, the rod portion of the feed screw is connected to the first linkage portion of the linkage block by a linkage assembly, the linkage assembly includes an insertion rod and a compression spring, the insertion rod is inserted in the first linkage portion and includes an insertion hole for insertion of the rod portion, and the compression spring is sleeved on the rod portion and disposed below the insertion rod.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
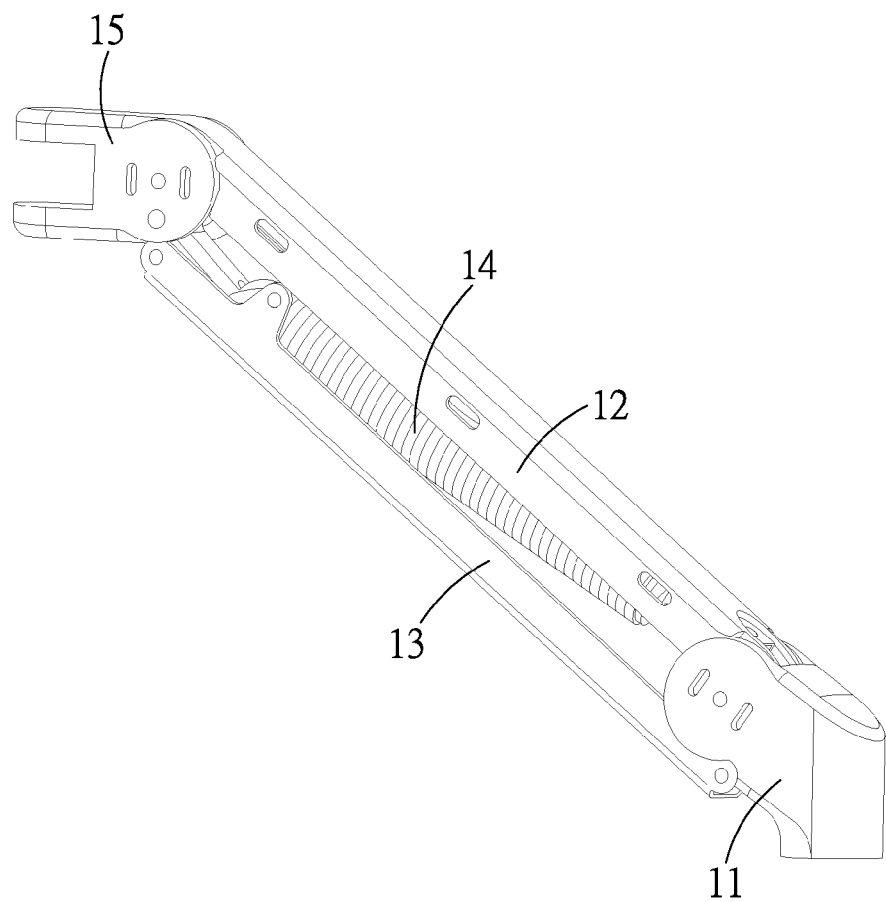
FIG. 1 shows a conventional support arm.
Figure 2:
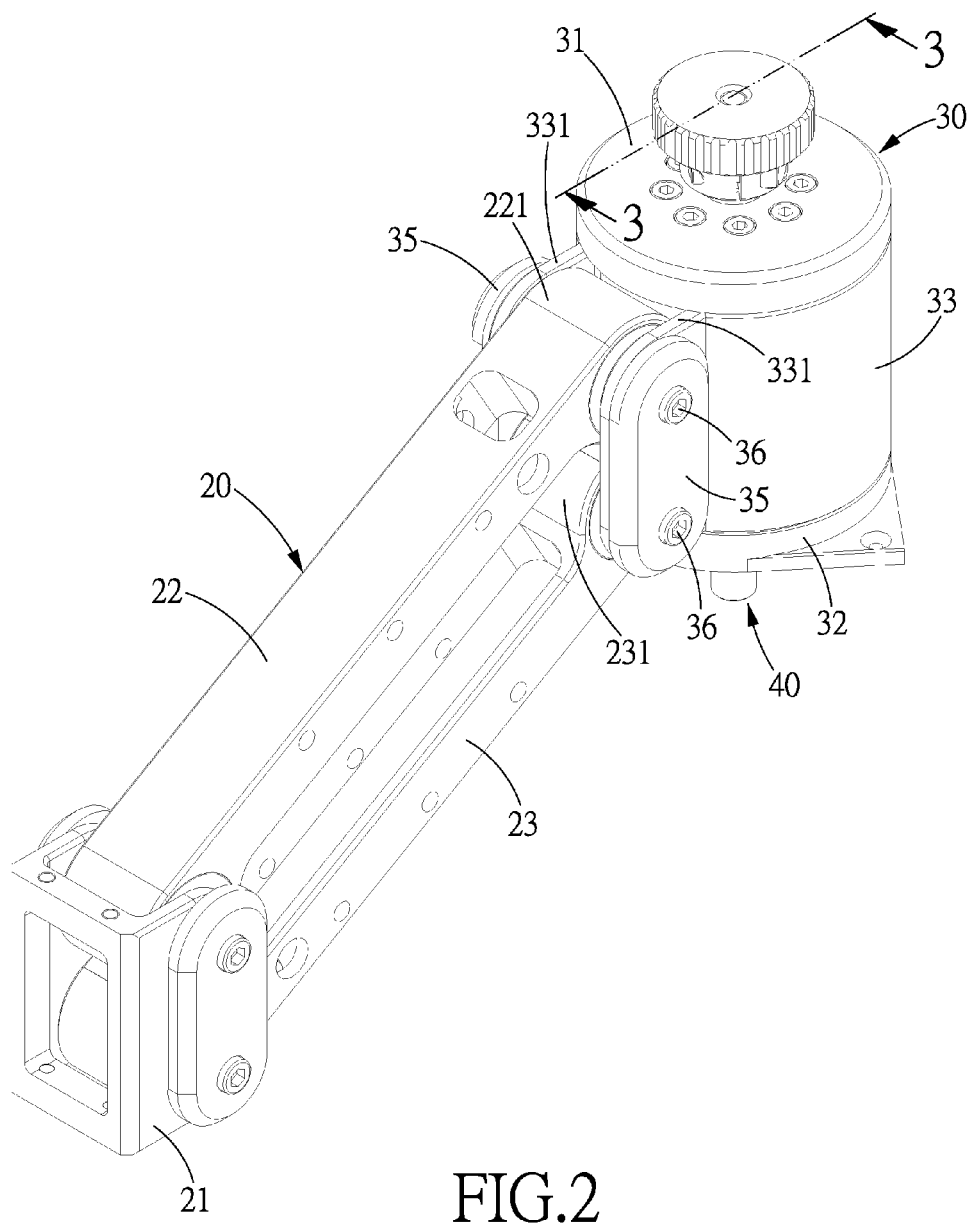
FIG. 2 shows a support arm with a multiple degree of freedom locking device in accordance with a first embodiment of the present invention.
Figure 3:
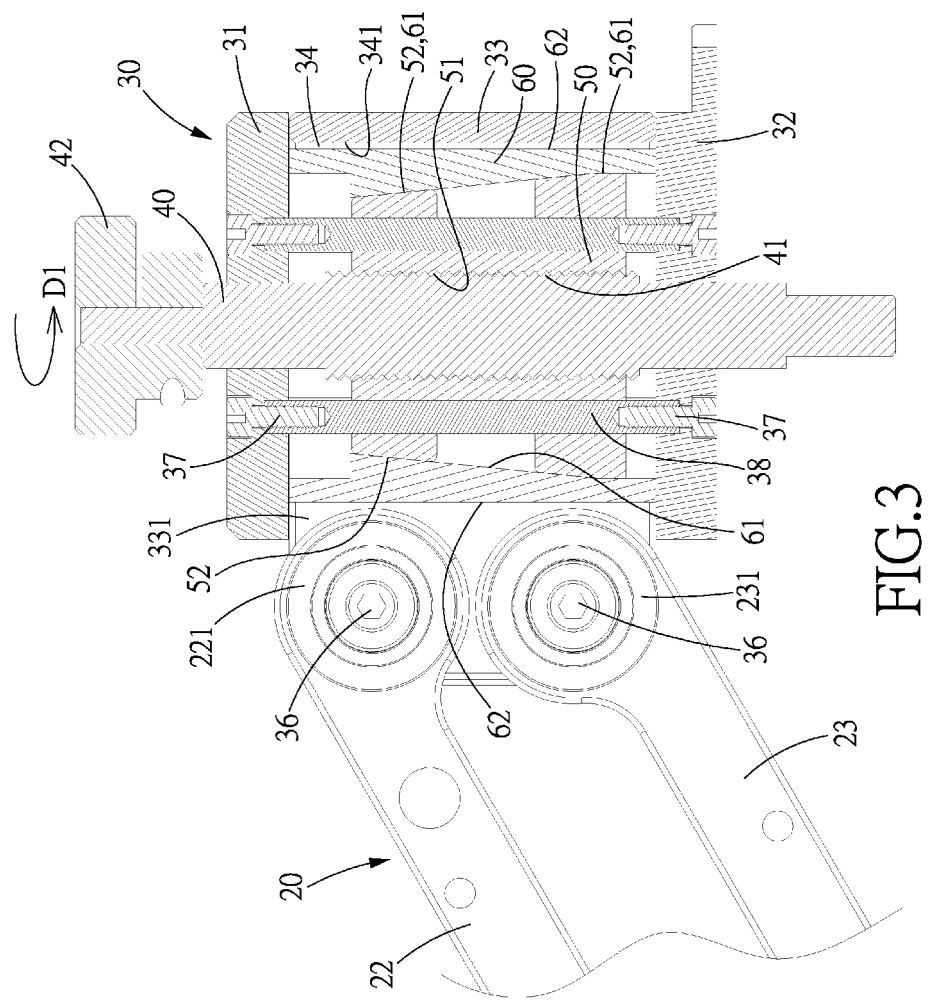
FIG. 3 is a cross sectional view taken along the line 3-3 of FIG. 2.
Figure 4:
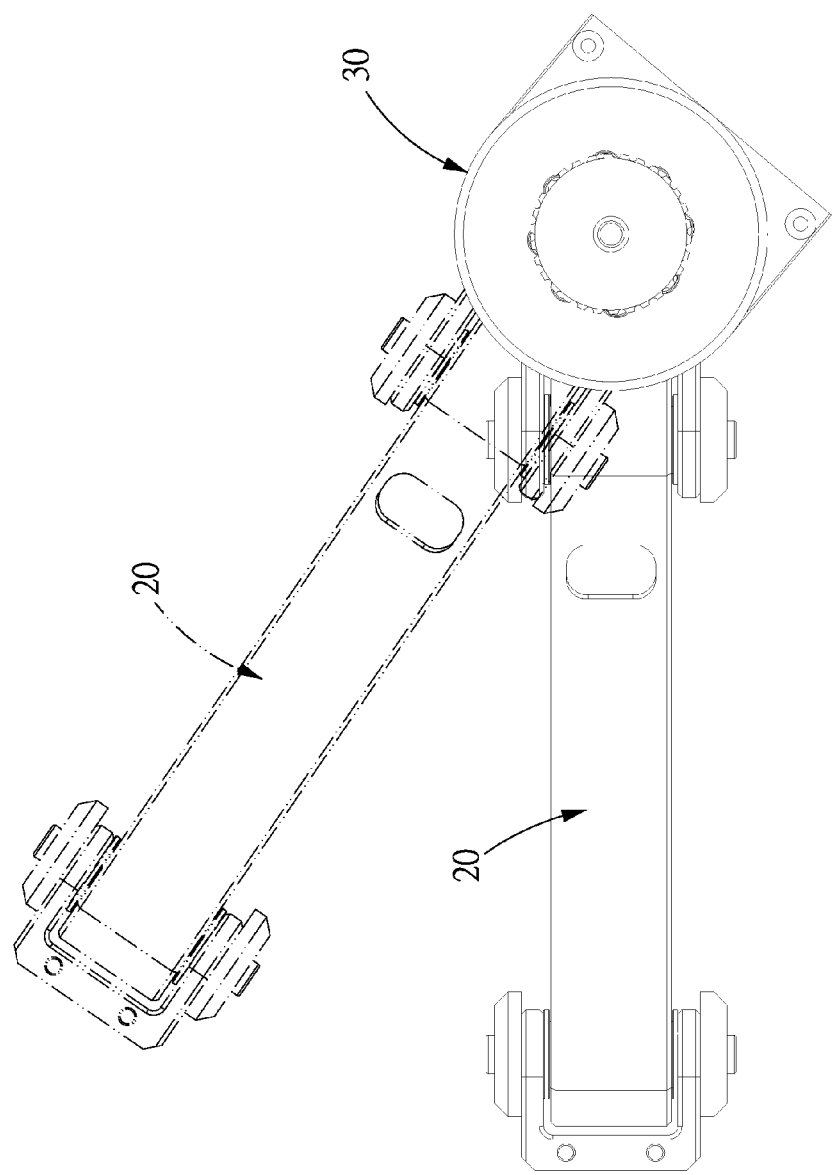
FIG. 4 is a top view showing the first adjustment of freedom (namely in the horizontal direction) of the support arm with a multiple degree of freedom locking device in accordance with the first embodiment of the present invention.

Referring to FIGS. 2-4, a support arm with a multiple degree of freedom locking device in accordance with a first embodiment of the present invention comprises: a support arm unit 20, an outer housing unit 30, a feed screw 40, a conical push block 50, and two conical baffles 60.

The support arm unit 20 includes a rack 21, a first connecting rod 22 with a first pivot portion 221 pivoted to the rack 21, and a second connecting rod 23 with a second pivot portion 231 pivoted to the rack 21. Since the support arm unit 20 is a conventional structure, further remarks would be omitted.

The outer housing unit 30 includes an upper housing 31, a lower housing 32, and a lateral housing 33 pivoted to the upper and lower housings 31, 32. The lateral housing 33 includes two ears 331 for pivotally clamping the first and second pivot portions 221, 231, and defines a pivot space 34 which is in communication with the first and second pivot portions 221, 231 with respect to the upper and lower housings 31, 32. In this embodiment, two lateral pieces 35 are mounted on the outer surface of the ears 331, and then bolts 36 are inserted through the lateral pieces 35, the ears 331 and the first and second pivot portions 221, 231, so that the first and second pivot portions 221, 231 are pivotally clamped between the two ears 331. The upper and lower housings 31, 32 are fixed by a plurality of screws 37 and guide rods 38.

The feed screw 40 is pivotally inserted in the upper and lower housings 31, 32 and is able to move up and down. The feed screw 40 includes a threaded portion 41 disposed in the pivot space 34, and a rotation portion 42 located outside the pivot space 34. In this embodiment, the rotation portion 42 is a rotation button which can be rotated to rotate the threaded portion 41.

The conical push block 50 is pivotally disposed in the pivot space 34 and able to move up and down, and includes a threaded hole 51 for meshing with the threaded portion 41, and an annular push-block slanting surface 52 disposed on a lateral surface of the conical push block 50. In this embodiment, the conical push block 50 is sleeved on the guide rods 38 and slides along the guide rods 38 to move up and down between the upper and lower housings 31, 32. The annular push-block slanting surface 52 tapers from the lower housing 32 toward the upper housing 31.

The two conical baffles 60 are two identical structures disposed in the pivot space 34 in an expandable manner and located between the conical push block 50 and the lateral housing 33, and each include an inner annular baffle slanting surface 61 for abutting against the annular push-block slanting surface 52, and an outer annular baffle slanting surface 62 located toward the inner surface 341 of the pivot space 34 and the first and second pivot portions 221, 231. In this embodiment, the inner annular baffle slanting surface 61 of the conical baffles 60 tapers from the lower housing 32 toward the upper housing 31.

Figure 5:
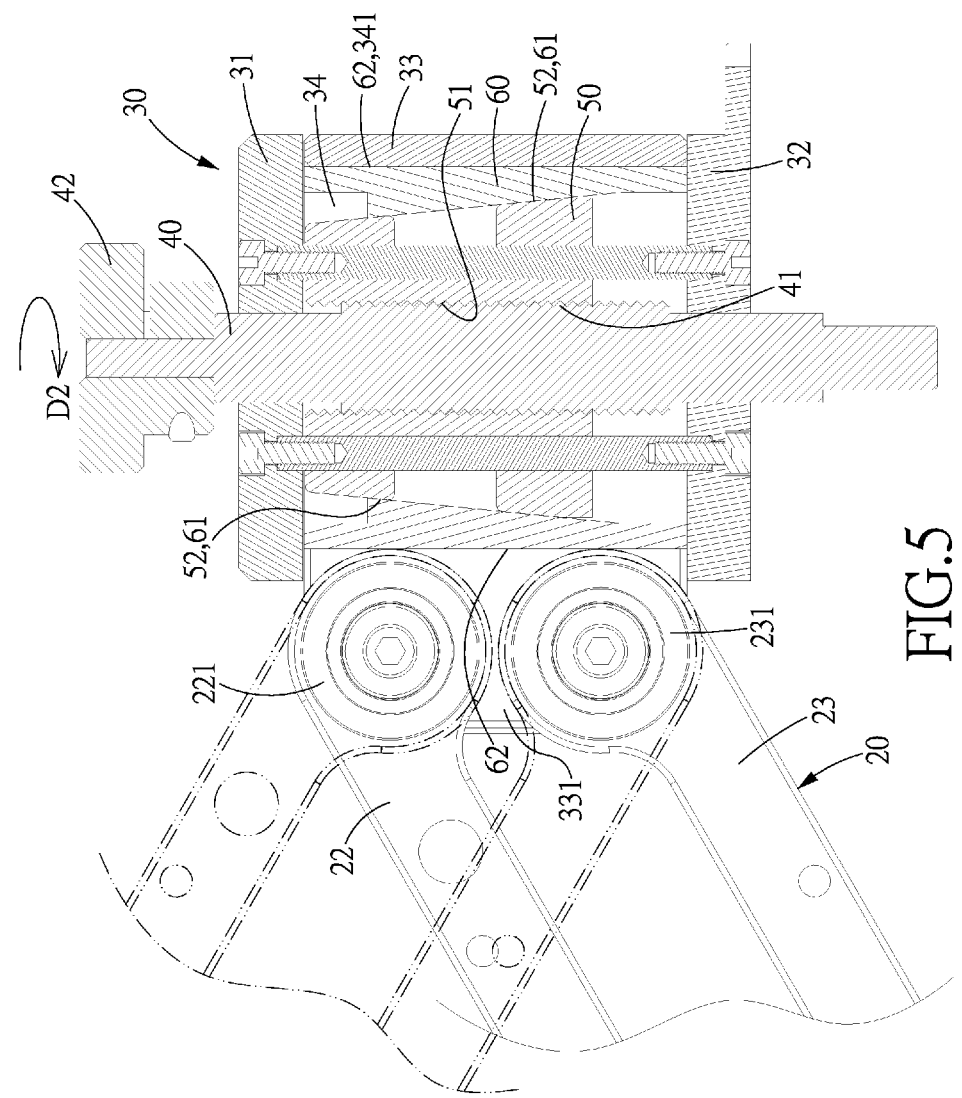
FIG. 5 is a cross sectional view showing the second adjustment of freedom (namely in the vertical direction) of the support arm with a multiple degree of freedom locking device in accordance with the first embodiment of the present invention.

As shown in FIGS. 3 and 5, when the feed screw 40 rotates in a first direction D1, it drives the conical push block 50 and the conical baffles 60 to rotate to make the outer annular baffle slanting surfaces 62 press against the inner surface 341 of the pivot space 34 and the first and second pivot portions 221, 231, so that the lateral housing 33 is unable to pivot with respect to the upper and lower housing 31, 32, and the first and second pivot portions 221, 231 are positioned between the two ears 331 in a non-rotatable manner. When the feed screw 40 rotates in a second direction D2 reverse to the first direction D1, the conical push block 50 and the conical baffles 60 are also driven to rotate to make the outer annular baffle slanting surfaces 62 move away from the inner surface 341 of the pivot space 34 and the first and second pivot portions 221, 231, so that the lateral housing 33 is able to pivot with respect to the upper and lower housing 31, 32, and the first and second pivot portions 221, 231 are able to pivot with respect to the two ears 331.

What mentioned above are the structural relations of the components of the preferred embodiment of the present invention, for a better understanding of the invention, its operating advantages and the specific objects attained by its uses, reference should be had to the following descriptive matter.

Referring then to FIGS. 3-5, the feed screw 40 is only able to rotate with respect to the outer housing unit 30, and after the support arm unit 20 is adjusted horizontally (as shown in FIG. 4) and vertically (as shown in FIG. 3) with respect to the outer housing unit 30. The rotation portion 42 of the feed screw 40 is rotated in the first direction D1 by rotating the rotation portion 42, at this moment, the conical push block 50 will move toward the upper housing 31 due to the engagement of the threaded portion 41 with the threaded hole 51 of the conical push block 50. Meanwhile, the annular push-block slanting surface 52 moves toward the inner annular baffle slanting surfaces 61 to push the conical baffles 60 toward the lateral housing 33 and toward the first and second pivot portions 221, 231, so as to make the outer annular baffle slanting surfaces 62 press against the inner surface 341 of the pivot space 34 and the first and second pivot portions 221, 231. When the outer annular baffle slanting surfaces 62 press against the inner surface 341 of the pivot space 34, the lateral housing 33 will be unable to pivot with respect to the upper and lower housings 31, 32, so that the first freedom (in the horizontal direction) of the support arm unit 20 is turned off. When outer annular baffle slanting surfaces 62 press against the first and second pivot portions 221, 231, the first and second pivot portions 221, 231 won't able to pivot with respect to the two ears 331, so that the second freedom of the support arm unit 20 (in the vertical direction) is turned off.

When the feed screw 40 rotates in the second direction D2 reverse to the first direction D1, the conical push block 50 is driven to move toward the lower housing 32, and the outer annular baffle slanting surfaces 62 moves away from the inner surface 341 of the pivot space 34 and the first and second pivot portions 221, 231, so that the lateral housing 33 is able to pivot with respect to the upper and lower housing 31, 32, and the first and second pivot portions 221, 231 are able to pivot with respect to the two ears 331. When the outer annular baffle slanting surfaces 62 moves away from the inner surface 341 of the pivot space 34, the lateral housing 33 will be able to pivot with respect to the upper and lower housings 31, 32, so that the first freedom (in the horizontal direction) of the support arm unit 20 is turned on. When outer annular baffle slanting surfaces 62 press against the first and second pivot portions 221, 231, the first and second pivot portions 221, 231 won't able to pivot with respect to the two ears 331, so that the second freedom of the support arm unit 20 (in the vertical direction) is turned on.

Referring then to FIGS. 6-10, a support arm with a multiple degree of freedom locking device in accordance with a second embodiment of the present invention is shown and similar to the first embodiment, except that:

The support arm with a multiple degree of freedom locking device in accordance with the second embodiment further comprises: a linkage housing 71, a linkage shaft 72, a linkage block 73 and a linkage rod 74.

The linkage housing 71 is fixed to the lower housing 32 and formed with a storage space 711.

The feed screw 40 further comprises a rod portion 43 opposite the threaded portion 42 and disposed in the storage space 711.

The linkage shaft 72 is pivotally disposed in the linkage housing 71 and includes a first shaft portion 721 disposed in the storage space 711, and a second shaft portion 722 connected to the first shaft portion 721 and located outside the storage space 711.

The linkage block 73 is slantingly disposed in the storage space 711 and located between the rod portion 43 and the linkage shaft 72, and includes a first linkage portion 731 pivoted to the rod portion 43, and a second linkage portion 732.

The linkage rod 74 is horizontally disposed in the storage space 711 and located between the linkage block 73 and the linkage shaft 72, and includes a linkage rod portion 741 pivoted to the second linkage portion 732, and an arc-shaped abutting portion 742.

Figure 6:
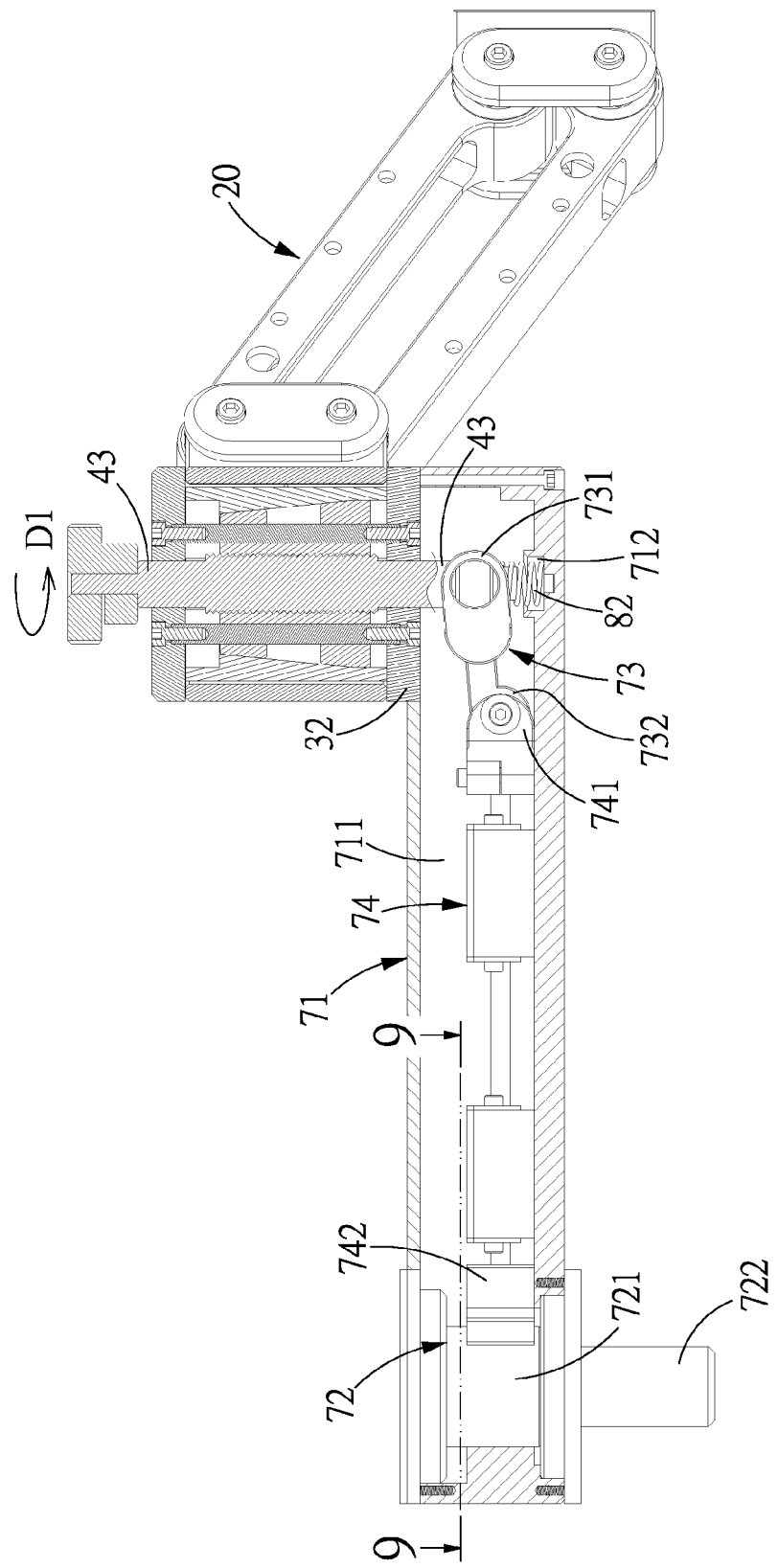
FIG. 6 shows a support arm with a multiple degree of freedom locking device in accordance with a second embodiment of the present invention.
Figure 8:
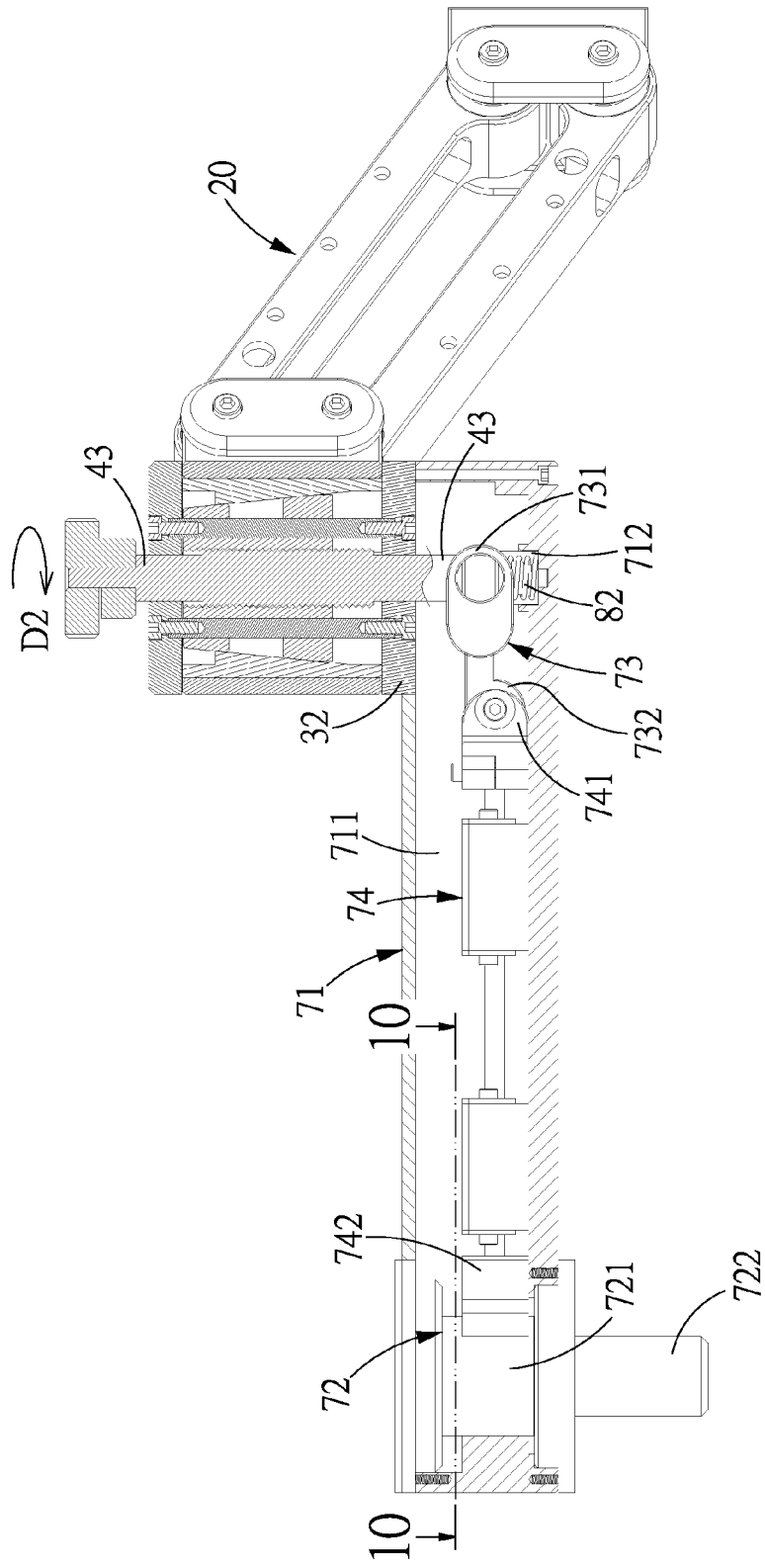
FIG. 8 is a cross sectional view showing the second adjustment of freedom (namely in the vertical direction) of the support arm with a multiple degree of freedom locking device in accordance with the second embodiment of the present invention.
Figure 10:
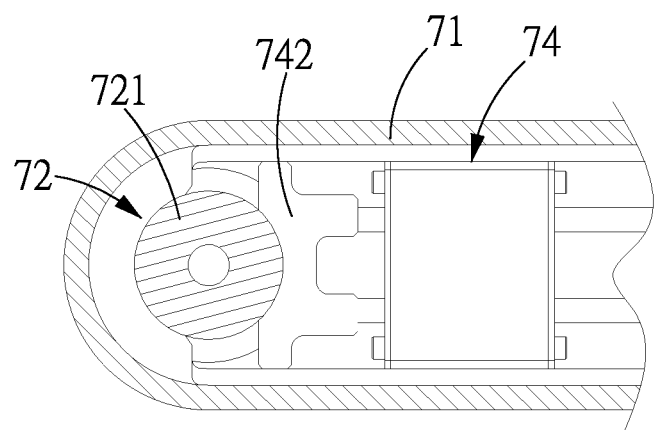
FIG. 10 is a cross sectional view of a part of the support arm with a multiple degree of freedom locking device in accordance with the second embodiment of the present invention, wherein the arc-shaped abutting portion of the linkage rod presses against the first shaft portion.

Referring then to FIGS. 6 and 8, when the feed screw 40 rotates in the first direction D1, the rod portion 43 will move downward to push the linkage block 73 from an inclined position to a horizontal position (as shown in FIG. 8) in which the arc-shaped abutting portion 742 of the linkage rod 74 presses against the first shaft portion 721 (as shown in FIG. 10), so that the linkage shaft 72 is disposed in the linkage housing 71 in a non-rotatable manner, and therefore, the third freedom of the support arm unit 20 (in the vertical direction) is turned off.

Figure 9:
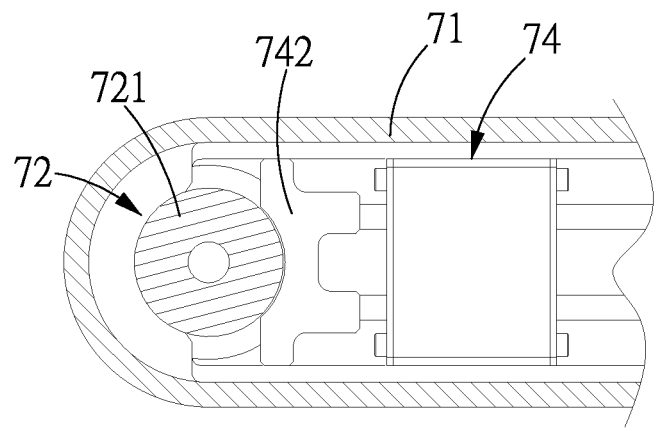
FIG. 9 is a cross sectional view of a part of the support arm with a multiple degree of freedom locking device in accordance with the second embodiment of the present invention, wherein the arc-shaped abutting portion of the linkage rod moves away from the first shaft portion.

When the feed screw 40 rotates in the second direction D2, the rod portion 43 will move upward to push the linkage block 73 back into the inclined position from the horizontal position (as shown in FIG. 6) where the arc-shaped abutting portion 742 of the linkage rod 74 moves away from the first shaft portion 721 (as shown in FIG. 9), so that the linkage shaft 72 is disposed in the linkage housing 71 in a rotatable manner, and therefore, the third freedom of the support arm unit 20 (in the vertical direction) is turned on.

Figure 7:
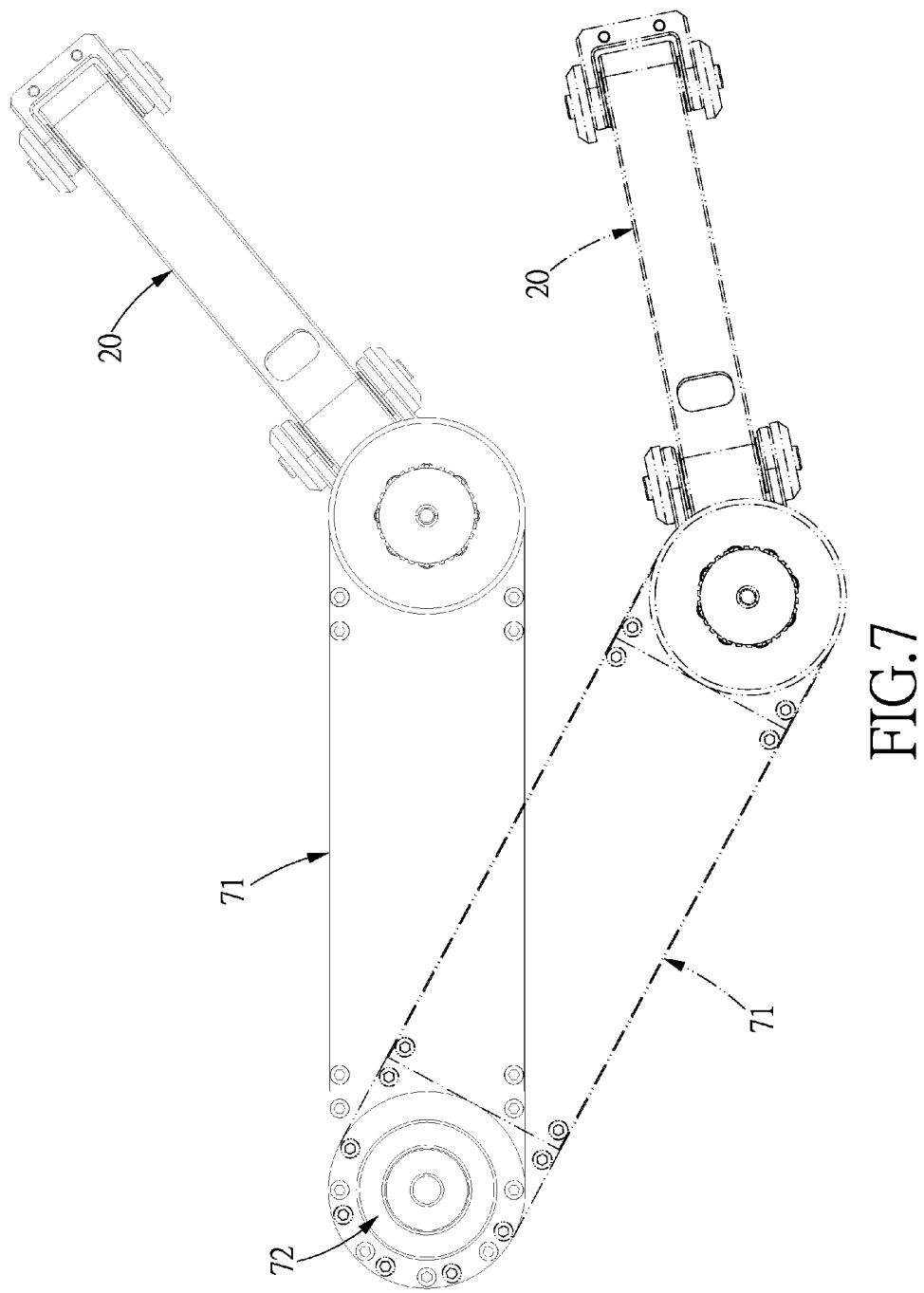
FIG. 7 is a top view showing the first adjustment of freedom (namely in the horizontal direction) of the support arm with a multiple degree of freedom locking device in accordance with the second embodiment of the present invention.
Figure 11:
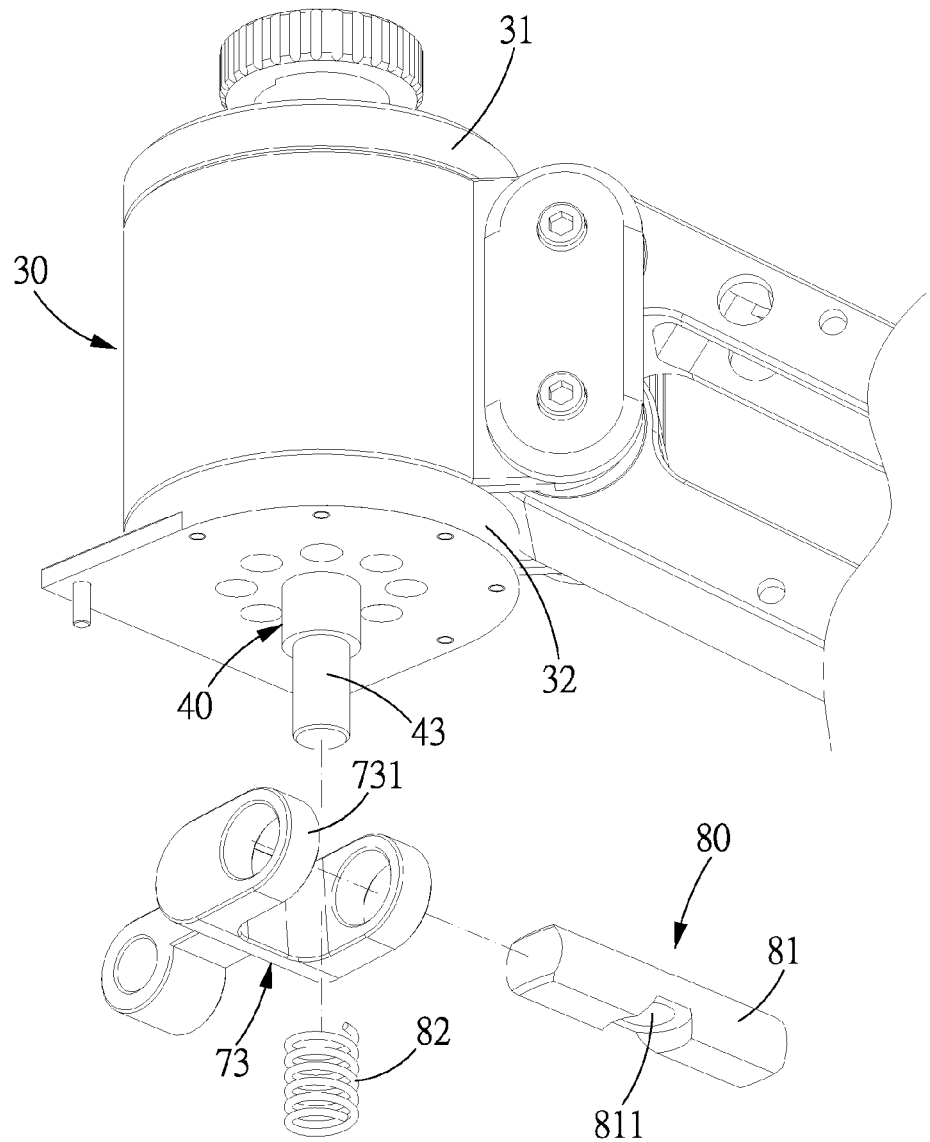
FIG. 11 is an exploded view of a part of the support arm with a multiple degree of freedom locking device in accordance with the second embodiment of the present invention, wherein the rod portion of the feed screw is connected to the first linkage portion of the linkage block by a linkage assembly.
Figure 12:
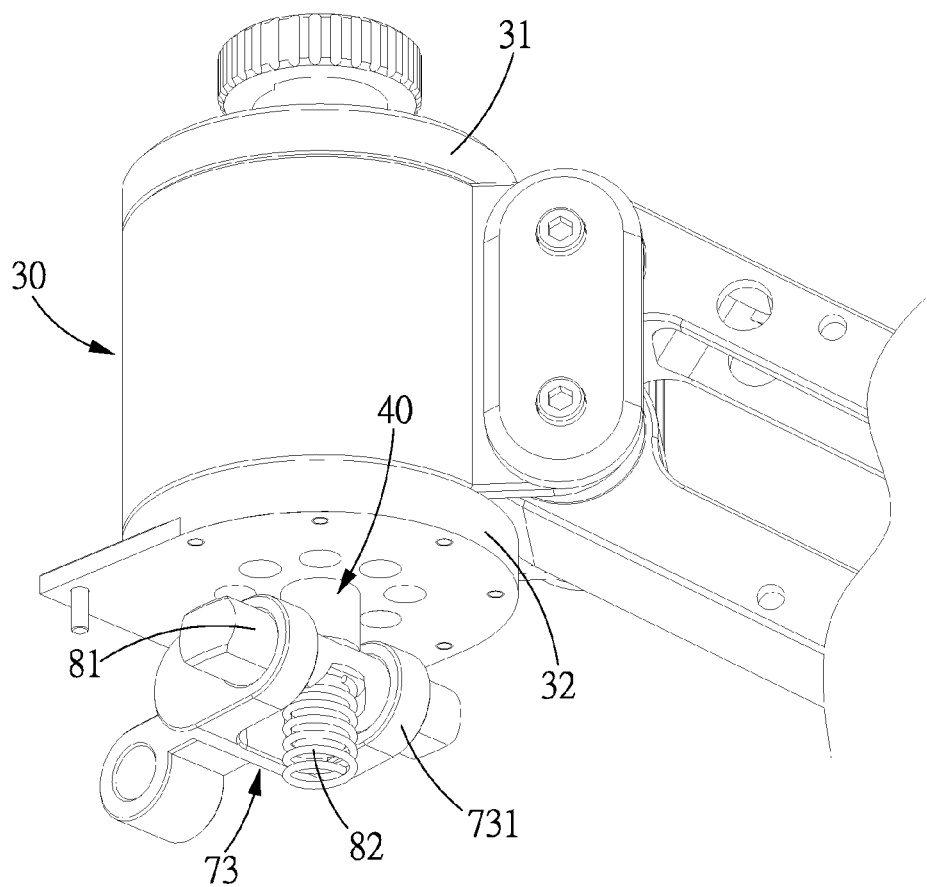
FIG. 12 is an assembly view of a part of the support arm with a multiple degree of freedom locking device in accordance with the second embodiment of the present invention, wherein the rod portion of the feed screw is connected to the first linkage portion of the linkage block by a linkage assembly.

It is to be noted that, as shown in FIGS. 7, 11 and 12, the feed screw 40 has to be movable in vertical direction and rotatable in horizontal direction when disposed in the outer housing unit 30. Therefore, the rod portion 43 of the feed screw 40 must be interactively connected to the first linkage portion 731 of the linkage block 73 by a linkage assembly 80. The linkage assembly 80 includes an insertion rod 81 and a compression spring 82. The insertion rod 81 is inserted in the first linkage portion 731 and includes an insertion hole 811 for insertion of the rod portion 43. The compression spring 82 which is sleeved on the rod portion 43 is disposed below the insertion rod 81 and located in a concave portion 712 of the storage space 711 of the linkage housing 71, in such a manner that the rod portion 43 of the feed screw 40 is rotatable with respect to the linkage block 73, and able to push the linkage block 73 to move between the inclined position and the horizontal position.

While we have shown various embodiments in accordance with the present invention, it is clear to those skilled in the art that further embodiments may be made without departing from the scope or spirit of the present invention.

What is claimed is:

1. A support arm with a multiple-degree-freedom locking device comprising:
   a support arm unit including a rack, a first connecting rod with a first pivot portion pivoted to the rack, and a second connecting rod with a second pivot portion pivoted to the rack;
   an outer housing unit including an upper housing, a lower housing, and a lateral housing disposed between the upper and lower housings, the lateral housing including two ears for clamping the first and second pivot portions and defining a pivot space with respect to the upper and lower housings, the pivot space being in communication with the first and second pivot portions;
   a feed screw pivotally inserted in the outer housing unit and including a threaded portion disposed in the pivot space, and a rotation portion located outside the pivot space;
   a conical push block disposed in the pivot space and able to move up and down, and including a threaded hole for meshing with the threaded portion, and an annular push-block slanting surface disposed on a lateral surface of the conical push block; and
   at least one conical baffle disposed in the pivot space in an expandable manner and located between the conical push block and the lateral housing, and the conical baffle including an inner annular baffle slanting surface for abutting against the annular push-block slanting surface, and an outer annular baffle slanting surface located toward the inner surface;

a plurality of guide rods inserted between the upper and lower housings, and the conical push block being sleeved on the guide rods to slide along the guide rods to move up and down between the upper and lower housings, wherein the annular push-block slanting surface tapers from the lower housing toward the upper housing, and the inner annular baffle slanting surface of the conical baffles tapers from the lower housing toward the upper housing;

when the feed screw rotates in a first direction, the conical push block and the conical baffle are driven to rotate to make the outer annular baffle slanting surface press against the inner surface of the pivot space and the first and second pivot portions, so that the lateral housing is unable to pivot with respect to the upper and lower housing, and the first and second pivot portions are positioned between the two ears in a non-rotatable manner, when the feed screw rotates in a second direction reverse to the first direction, the conical push block and the conical baffle are also driven to rotate to make the outer annular baffle slanting surface move away from the inner surface of the pivot space and the first and second pivot portions, so that the lateral housing is able to pivot with respect to the upper and lower housing, and the first and second pivot portions are able to pivot with respect to the two ears.

\* \* \* \* \*